(12) United States Patent
Ekelund et al.

(10) Patent No.: US 11,408,387 B2
(45) Date of Patent: Aug. 9, 2022

(54) AUTO-STOP START SYSTEM FOR A VEHICLE

(71) Applicant: Ningbo Geely Automobile Research & Development Co., Ltd., Ningbo (CN)

(72) Inventors: Johan Ekelund, Gothenburg (SE); Di Ding, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/495,053

(22) Filed: Oct. 6, 2021

(65) Prior Publication Data

US 2022/0025839 A1    Jan. 27, 2022

Related U.S. Application Data

(63) Continuation of application No. PCT/CN2020/080860, filed on Mar. 24, 2020.

(30) Foreign Application Priority Data

Apr. 15, 2019    (EP) .................................... 19169216

(51) Int. Cl.
   *F02N 11/08*    (2006.01)
(52) U.S. Cl.
   CPC ...... *F02N 11/0822* (2013.01); *F02N 11/0833* (2013.01); *F02N 2200/123* (2013.01); *F02N 2300/20* (2013.01)

(58) Field of Classification Search
   CPC ............. F02N 11/0803; F02N 11/0814; F02N 11/0822; F02N 11/0833; F02N 11/0844; F02N 2300/2011
   See application file for complete search history.

(56) References Cited

U.S. PATENT DOCUMENTS

2002/0183917 A1\* 12/2002 Wolf .................. F02N 11/0822
                                                              701/112
2011/0230309 A1\* 9/2011 Albrecht ............. F02N 11/0822
                                                              477/183

(Continued)

FOREIGN PATENT DOCUMENTS

CN    101749127 A    6/2010
CN    102791558 A    11/2012

(Continued)

OTHER PUBLICATIONS

International Search Report from corresponding International Application No. PCT/CN2020/080860, dated Jun. 30, 2020, 2 pages.

*Primary Examiner* — Phutthiwat Wongwian
*Assistant Examiner* — Arnold Castro
(74) *Attorney, Agent, or Firm* — Tucker Ellis LLP

(57) ABSTRACT

An auto-stop start system for a vehicle. The auto-stop start system has a control unit with an auto-stop start function controlling stop and start of an engine of the vehicle, and a control device by which control device the auto-stop start function can be temporarily deactivated by an operator of the vehicle. The control unit is configured to reactivate the auto-stop start function after a predetermined duration of a temporary deactivation. The predetermined duration of the temporary deactivation of the auto-stop start function is selectable by means of the control device.

13 Claims, 2 Drawing Sheets

(56) References Cited

U.S. PATENT DOCUMENTS

2014/0278019 A1\* 9/2014 Be ................... F02D 29/02
 701/112
2018/0043878 A1\* 2/2018 Khafagy ............. F02N 11/0822
2018/0372053 A1\* 12/2018 Kuretake .......... B60W 50/0098

FOREIGN PATENT DOCUMENTS

| CN | 103069136 A | 4/2013 |
|----|-------------|--------|
| CN | 103133155 A | 6/2013 |
| CN | 106285972 A | 1/2017 |
| DE | 102008060350 A1 | 6/2010 |
| JP | 2012127315 A | 7/2012 |

\* cited by examiner

AUTO-STOP START SYSTEM FOR A VEHICLE

RELATED APPLICATION DATA

This application is a continuation of International Patent Application No. PCT/CN2020/080860, filed Mar. 24, 2020, which claims the benefit of European Patent Application No. 19169216.9, filed Apr. 15, 2019, the disclosures of which are incorporated herein by reference in their entireties.

TECHNICAL FIELD

The invention relates to an auto-stop start system for a vehicle and method for controlling an auto-stop start system of a vehicle.

BACKGROUND

An auto-stop start system of a vehicle is often used for reducing fuel consumption and emissions from an internal combustion engine by reducing the time the engine is idling. The system will automatically stop and start the engine provided that some predetermined conditions are fulfilled. Typically, the engine is stopped when it is predicted that the vehicle will be stationary for a longer amount of time. For example, the engine is stopped when the vehicle is waiting at traffic lights or when the vehicle frequently comes to a stop in traffic jams.

The effectiveness of such an auto-stop start system is however dependent on the traffic situation. The amount of time the vehicle actually remains stationary will have a great impact on the effectiveness of the system. Should the system stop and start to often, not only can the emissions increase, but it can cause annoyance to the driver due to a delayed power response when the driver requests acceleration. In addition, extensive stop and start repetitions will cause increased wear on several components, such as battery, starter motor and will have an impact on the lubrication of the engine.

SUMMARY

An objective of the invention is to provide an auto-stop start system for a vehicle, where the use of the system can be improved.

The objective is achieved by an auto-stop start system for a vehicle, wherein the auto-stop start system has a control unit with an auto-stop start function controlling stop and start of an engine of the vehicle, and a control device by which control device the auto-stop start function can be temporarily deactivated by an operator of the vehicle, and wherein the control unit is configured to reactivate the auto-stop start function after a predetermined duration of a temporary deactivation, and the predetermined duration of the temporary deactivation of the auto-stop start function is selectable by means of the control device.

The invention is based on the insight that by such an auto-stop start system, the operator or driver is able to pause the auto-stop start function without turning off the auto-stop start function when the auto-stop start function would be inconvenient or inappropriate to use due to the traffic conditions. By an automatic reactivation of the auto-stop start function by means of the control unit, the risk of non-use of the function later on due to the driver is forgetting to reactivate the function is eliminated. Since the operator is able to select the duration of the temporary deactivation of the auto-stop start function, the auto-stop start function can be paused in a way adapted to the current traffic conditions. By the invention, an operator of the vehicle can be more prone to not turning off the auto-stop start function.

By "selectable by means of the control device" is meant that the predetermined duration of the temporary deactivation is set by one or more output signals from the control device and thereby the operator has the opportunity to adjust the predetermined duration of the temporary deactivation by maneuvering the control device. For example, the operator can use multiples of a default value or choose a value within an interval.

According to one embodiment of the auto-stop start system, the control unit is configured to reactivate the auto-stop start function after a predetermined time period which time period is selectable by means of the control device. Hereby, the operator may deactivate the automatic stopping of the engine if the vehicle is approaching a slow moving traffic section without having to actively reactivate the auto-stop start function or keep the current state in mind.

For example, the time period can be selectable within an interval from 5 seconds to 5 minutes, preferably 30 seconds to 3 minutes.

According to a further embodiment, the control unit is configured to reactivate the auto-stop start function after a predetermined distance travelled by the vehicle which distance is selectable by means of the control device. Hereby, the auto stop-start system can be used efficiently when a driver knows the traffic loads. For example, when the distance of a traffic merge jam is known while the time spent in this traffic merge jam is unknown, a travelled distance-based reactivation of the auto-stop start function can be beneficial.

For example, the distance can be selectable within an interval from 50 meters to 1000 meters, preferably 100 to 500 meters.

According to a further embodiment, the predetermined duration of the temporary deactivation is stepwise increasable by means of the control device. Hereby, the duration of the temporary deactivation state may be adjusted by the operator to suit the predicted approaching traffic situation.

According to a further embodiment, the auto-stop start function can be turned off and on by means of the control device, and, preferably the temporary deactivation of the auto-stop start function is selectable by holding the control device, such as pressing a button, for a predetermined time period in a position for which the auto-stop start function is turned off. Hereby, the need for additional hardware can be eliminated and a user friendly control input can be provided for the operator.

According to a further embodiment, multiple presses of a button can be used for changing between an active auto-stop start function and a temporary deactivation of the auto-stop start function, and holding the button pressed for a predetermined time period may allow the auto-stop start function to be disabled.

According to another aspect of the invention, a further objective is to provide a method for controlling an auto-stop start system of a vehicle, by which method the use of the system can be improved.

This objective is achieved by a method for controlling an auto-stop start system of a vehicle, wherein the method comprises the steps of temporarily deactivating an auto-stop start function of the auto-stop start system by a control device maneuverable by an operator of the vehicle, and reactivating the auto-stop start function by a control unit after a predetermined duration of a temporary deactivation, and wherein the method comprises the step of selecting the predetermined duration of the temporary deactivation of the auto-stop start function by means of the control device.

In addition, the invention relates to a vehicle comprising an auto-stop start system according to the invention.

The advantages of the method and the vehicle are similar to the advantages already discussed hereinabove with reference to the different embodiments of the auto-stop start system.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
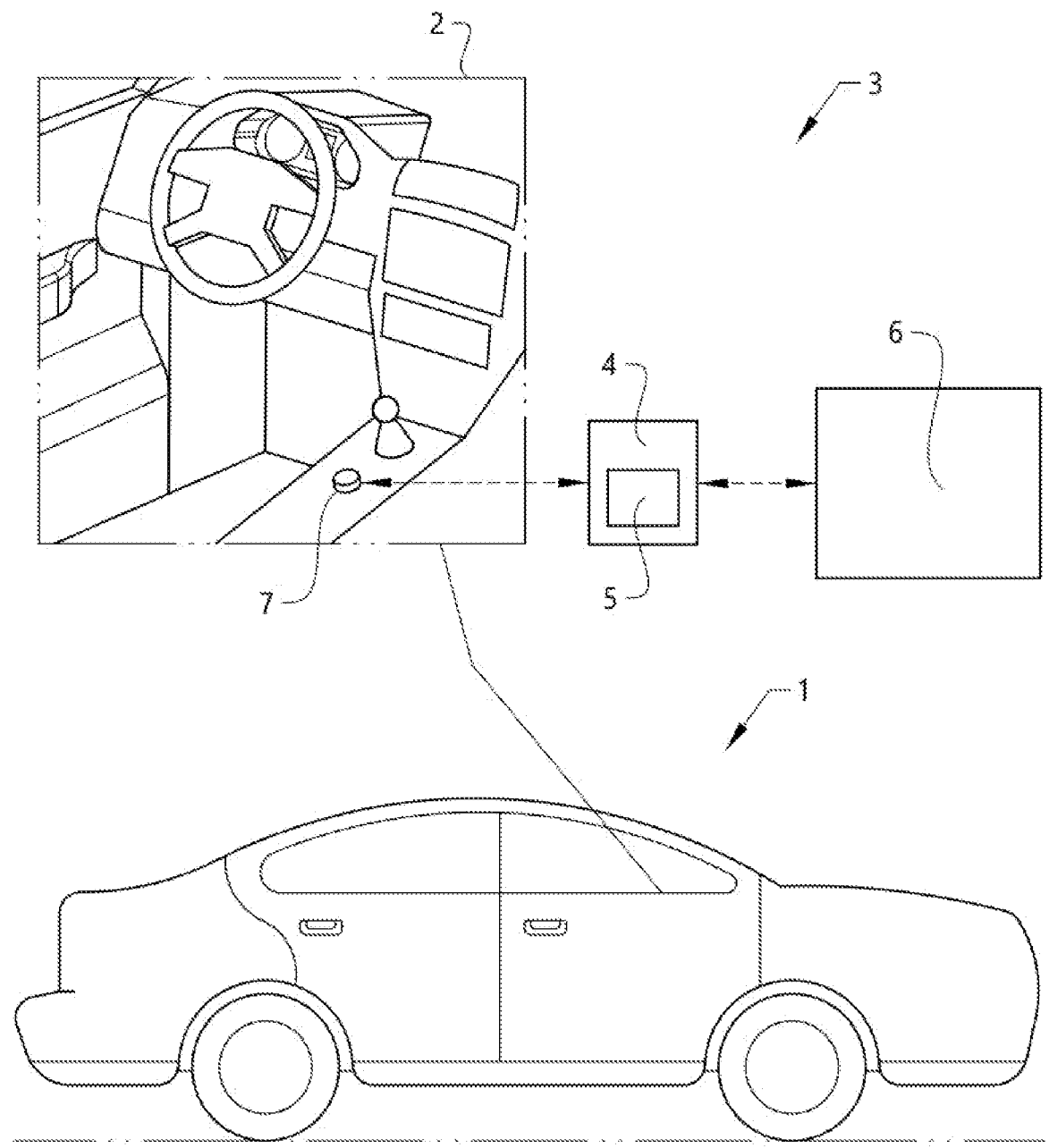
FIG. 1 shows an auto-stop start system and a vehicle provided with the auto-stop start system.

FIG. 1 shows a vehicle 1, an enlarged part 2 of the interior of the vehicle 1 and a schematic view of an auto-stop start system 3. The auto-stop start system 3 has a control unit 4 with an auto-stop start function 5 controlling stop and start of an engine 6 of the vehicle 1. The auto-stop start function 5 is used for automatically stop and start the engine 6 provided that some predetermined conditions are fulfilled, for reducing the time the engine 6 is idling.

The auto-stop start system 3 further comprises a control device 7 arranged in the vehicle 1 by which control device 7 the auto-stop start function 5 can be temporarily deactivated by an operator of the vehicle 1. When the auto-stop start function 5 is deactivated no automatic stop or start of the vehicle 1 is performed by the control unit 4. The control unit 4 is configured to reactivate the auto-stop start function 5 after a predetermined duration of a temporary deactivation. Thereafter, the engine 6 is again automatically stopped and started according to the predetermined conditions. The predetermined duration of the temporary deactivation of the auto-stop start function 5 is selectable by means of the control device 7.

For example, the control device 7 can be a button to be pressed for temporarily deactivating the auto-stop start function 5. The predetermined duration of the temporary deactivation selected and/or the remaining part of the temporary deactivation duration can be shown on a display.

Optionally, the control device 7 can also be arranged for turning off and on the auto-stop start system 3 or auto-stop start function 5. For example, the temporary deactivation of the auto-stop start function 5 can be selectable by holding the control device 7 for a predetermined time period in a position for which the auto-stop start function 5 is turned off. Thus, a short press of the button 7 will turn off the auto-stop start function 5 while pressing the button 7 longer will instead deactivate the auto-stop start function 5.

Optionally, the predetermined duration of the temporary deactivation can be stepwise increased by means of the control device, by repeatedly pressing the button 7 for instance.

Alternatively, multiple presses of the button 7 can be used for changing between an active auto-stop start function and a temporary deactivation of the auto-stop start function 5, and holding the button 7 pressed for a predetermined time period may allow the auto-stop start function 5 to be disabled.

In another embodiment, the control device could instead be integrated in a touch screen where the predetermined duration of the temporary deactivation can be selected and seen on the display device.

The control unit 4 can be configured to reactivate the auto-stop start function 5 after a predetermined time period which time period is selectable by means of the control device 7 and/or the control unit 4 can be configured to reactivate the auto-stop start function 5 after a predetermined distance travelled by the vehicle 1 which distance is selectable by means of the control device 7.

Figure 2:
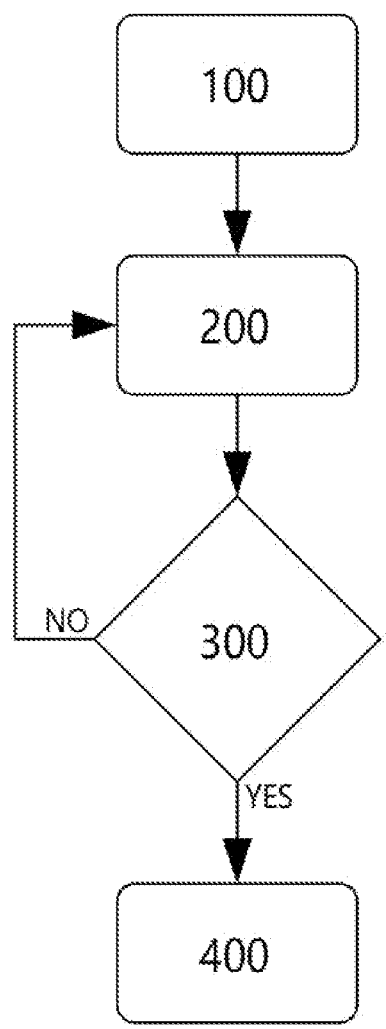
FIG. 2 is a flow chart illustrating a method for controlling an auto-stop start system of a vehicle.

FIG. 2 shows a flow chart illustrating one example embodiment of a method for controlling an auto-stop start system 3 of a vehicle 1. As regards the components used for performing the method, reference is also made to the description hereinabove and FIG. 1.

The method comprises the step of receiving 100 a request signal from a control device 7 maneuverable by an operator of the vehicle 1, for deactivating an auto-stop start function 5 of the auto-stop start system and selecting a predetermined duration of a temporary deactivation of the auto-stop start function 5.

The method further comprises the step of temporarily deactivating 200 the auto-stop start function 5 of the auto-stop start system 3. Such deactivation can optionally be subject to further conditions. Thereafter, the method comprises the step of checking 300 if the predetermined duration of the temporary deactivation has passed. Provided that the predetermined duration is identified to have been passed, i.e. if "YES" in FIG. 2, the method comprises the step of reactivating 400 the auto-stop start function 5 by a control unit 4 after the predetermined duration of the temporary deactivation. Such reactivation can optionally be subject to other conditions. Otherwise, i.e. if "NO" in FIG. 2, the auto-stop start function 5 is maintained in the deactivated state.

The method can comprise the step of reactivating the auto-stop start function after a predetermined time period which time period is selectable by means of the control device and/or reactivating the auto-stop start function after a predetermined distance travelled by the vehicle which distance is selectable by means of the control device.

The control unit 4 may comprise one or more microprocessors and/or one or more memory devices or any other components for executing computer programs to perform the method. Thus, the control unit 4 is preferably provided with a computer program comprising program code means for performing the steps of any example embodiment of the method described hereinabove. The control unit 4 can be a separate component or be integrated in another controller of the vehicle 1.

It is to be understood that the present invention is not limited to the embodiments described above and illustrated in the drawings; rather, the skilled person will recognize that many changes and modifications may be made within the scope of the appended claims.

What is claimed is:

1. An auto-stop start system for a vehicle, the auto-stop start system having a control unit with an auto-stop start function controlling stop and start of an engine of the vehicle, and a control device by which control device the auto-stop start function can be temporarily deactivated by an operator of the vehicle, the control unit being configured to reactivate the auto-stop start function after a predetermined duration of a temporary deactivation, the predetermined duration of the temporary deactivation of the auto-stop start function being selectable by means of the control device, wherein the control unit is configured to reactivate the auto-stop start function after a predetermined distance travelled by the vehicle which distance is selectable by means of the control device.

2. The auto-stop start system for a vehicle according to claim 1, wherein the control unit is configured to reactivate the auto-stop start function after a predetermined time period which time period is selectable by means of the control device.

3. The auto-stop start system for a vehicle according to claim 2, wherein the time period is selectable within an interval from 5 seconds to 5 minutes.

4. The auto-stop start system for a vehicle according to claim 2, wherein the time period is selectable within an interval from 30 seconds to 3 minutes.

5. The auto-stop start system for a vehicle according to claim 1, wherein the distance is selectable within an interval from 50 meters to 1000 meters.

6. The auto-stop start system for a vehicle according to claim 1, wherein the distance is selectable within an interval from 100 meters to 500 meters.

7. The auto-stop start system for a vehicle according to claim 1, wherein the predetermined duration of the temporary deactivation is stepwise increasable by means of the control device.

8. The auto-stop start system for a vehicle according to claim 1, wherein the auto-stop start function can be turned off and on by means of the control device.

9. The auto-stop start system for a vehicle according to claim 8, wherein the temporary deactivation of the auto-stop start function is selectable by holding the control device for a predetermined time period in a position for which the auto-stop start function is turned off.

10. The auto-stop start system for a vehicle according to claim 1, wherein the control device is a button to be pressed for temporarily deactivate the auto-stop start function.

11. A vehicle comprising an auto-stop start system according to claim 1.

12. A method for controlling an auto-stop start system of a vehicle, the method comprises the steps of temporarily deactivating an auto-stop start function of the auto-stop start system by a control device maneuverable by an operator of the vehicle, and reactivating the auto-stop start function by a control unit after a predetermined duration of a temporary deactivation, and selecting the predetermined duration of the temporary deactivation of the auto-stop start function by means of the control device, wherein reactivating the auto-stop start function after a predetermined distance travelled by the vehicle which distance is selectable by means of the control device.

13. The method according to claim 12, wherein reactivating the auto-stop start function after a predetermined time period which time period is selectable by means of the control device.

* * * * *